United States Patent [19]

Kanner

[11] Patent Number: 4,710,861
[45] Date of Patent: Dec. 1, 1987

[54] ANTI-RIPPLE CIRCUIT

[76] Inventor: Martin Kanner, 42 Glenwood Rd., Plainview, N.Y. 11803

[21] Appl. No.: 870,176

[22] Filed: Jun. 3, 1986

[51] Int. Cl.$^4$ ............................................. H02M 1/14
[52] U.S. Cl. ........................................ 363/46; 323/275
[58] Field of Search ................ 363/39, 44, 45, 46; 323/275, 276

[56] References Cited

U.S. PATENT DOCUMENTS

| 3,474,346 | 10/1969 | Schaefer | 363/45 X |
| 3,553,566 | 1/1971 | Nagy, Jr. | 363/45 |
| 4,099,227 | 7/1978 | Liptak | 363/45 X |
| 4,307,305 | 12/1981 | Morris | 363/45 X |
| 4,594,648 | 6/1986 | Gallios | 363/46 |

OTHER PUBLICATIONS

IBM Technical Disclosure Bulletin, vol. 14, No. 2, July 1971, pp. 523–524.

Primary Examiner—Peter S. Wong
Assistant Examiner—Anita M. Ault
Attorney, Agent, or Firm—Seymour Levine

[57] ABSTRACT

A ripple reducing circuit wherein ripple voltages across the output terminals of a voltage source are coupled through a ripple sensing circuit to an amplifier. The sensed ripple is amplified and phase reversed to provide signals in phase opposition to the ripple signals. These phase opposition signals are coupled via an anti-ripple element to the output terminals of the voltage source for effecting ripple level reduction.

4 Claims, 4 Drawing Figures

ANTI-RIPPLE CIRCUIT

BACKGROUND OF THE INVENTION

1. Field of the Invention

The invention pertains to the field of filter circuits, and more particularly to filters for reducing a.c. components (ripple) on direct current signals. 2. Description of the Prior Art It is usually the requirement of a power supply to provide a relatively ripple-free source of d.c. potential from an a.c. line. A power supply, however, generally gives an output voltage which contains a.c. ripple components fluctuating about the desired d.c. potential. In the prior art, filters are inserted between the rectifier of the power supply and its output terminals to attenuate the rippe components to tolerable levels.

Filters employed for attenuating, the ripple components are generally of the type that utilize capacitors, inductors, or a combination of a capacitors and inductors to achieve the desired ripple reduction. In many power supplies these filters become relatively large and contribute appreciably to the size and weight of the unit. When filters utilizing only capacitors are utilized for power supplies having low ripple level requirements, the capacitance value must be high. Generally these capacitors are of large physical size, are heavy, are costly, and are difficult to package. When inductance is used to reduce the size of the capacitor, the ability of the resulting circuit to respond to rapid load variations is diminished.

The present invention provides a circuit for achieving low ripple levels with capacitors of moderate capacitance value and concomitant moderate size and weight.

SUMMARY OF THE INVENTION

A circuit, for reducing a.c. components superposed on a d.c. signal, constructed in accordance with the principles of the present invention includes a differential amplifier having its inverting terminal coupled to the output terminal of a d.c. source, to receive the a.c. signals to be reduced, and an anti-ripple capacitor coupled between the output terminal of the differential amplifier and the output terminal of the d.c. source. The non-inverting terminal of the differential amplifier is coupled to a common potential, which may be the ground potential. This coupling of the differential amplifier provides a signal at the output terminals of the d.c. source that tends to cancel the a.c. components. The effectiveness of the ripple reduction is a function of the anti-ripple capacitance and the overall gain of the amplifier.

In a second embodiment of the invention, a current sensing element is added to the above described embodiment which senses the output current and couples a signal representative thereof to the non-inverting terminal. This signal establishes a variable reference at the non-inverting terminal, thereby providing additional opposition to the ripple current and further reducing the ripple level.

DESCRIPTION OF THE PREFERRED EMBODIMENTS

While the invention will be described with reference to reducing ripple on a d.c. voltage emitted from a d.c. voltage source, it should be recognized by those skilled in the art that the invention may also be utilized for reducing ripple on current from a d.c. current source and for other filter applications including low, high, and bandpass filters.

Figure 1:
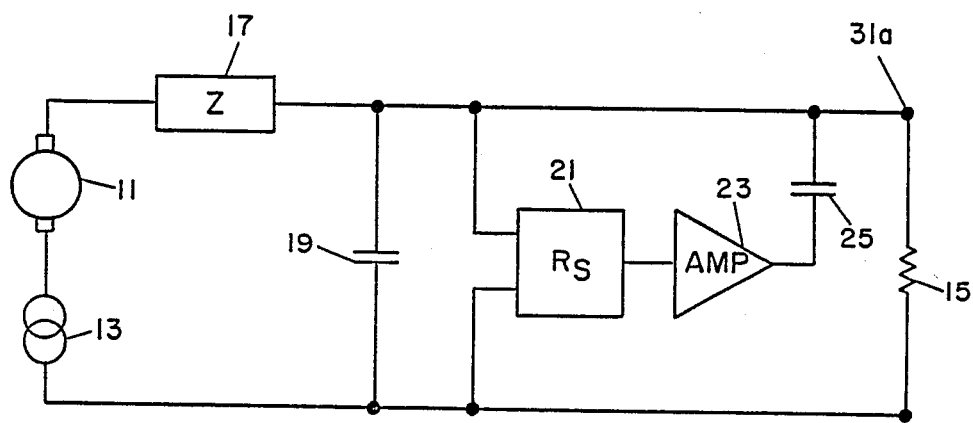
FIG. 1 is a schematic diagram partially in block form, of a ripple level reducing circuit utilizing one embodiment of the invention.

Referring now to FIG. 1, a d.c. source, which may be represented as a d.c. voltage generator 11 in series with an D.C. voltage generator 13, couples a d.c. voltage, with ripple superposed thereon, to load 15 via the source impedance 17. A filter circuit including a capacitor 19 and a novel ripple reducing circuit, comprising ripple sensing element ($R_S$)21, amplifier 23, and anti-ripple capacitor 25, are shunted across the output terminals of the d.c. source for ripple reduction. If should be recognized that the well known circuit of a d.c. source with a capacitive filter results when the novel ripple reducing circuit is removed. Ripple of the output terminals of such a well known d.c. source is a function of the capacitance value of the filter capacitor 19. The size of this filter capacitor 19 is determined by the capacitance value required to achieved the desired ripple level, the magnitude of the d.c. voltage, the magnitude of the source impedance, the load variations, and the bandwidth of the ripple voltage.

The addition of the novel ripple reducing circuit to this well known circuit provides appreciable ripple reduction with capacitors of moderate size, or alternatively a significant reduction in the size of the filter capacitor while maintaining the degree of ripple reduction. To accomplish this ripple reduction, ripple sensing element 21 couples the ripple voltage across the filter capacitor 19 to the amplifier 23 wherein the ripple voltage is phase reversed and amplified. This phase reversed amplified ripple is coupled via the anti-ripple capacitor 25 to the output terminals of the d.c. source thereby reducing the output ripple level. The ripple reduction is a function of the capacitance value of the anti-ripple capacitor 25 and the gain of the amplifier, the combination acting as a shunt capacitor. To utilize capacitors of reasonable size and achieve desired ripple levels, a high gain, stable amplifier is employed. An approximate capacitance value for the anti-ripple capacitor 25 is given by the ratio C/A, where C is the shunt capacitance required to achieve the desired ripple level without the anti-ripple circuit and A is the gain of the amplifier 23.

Figure 2:
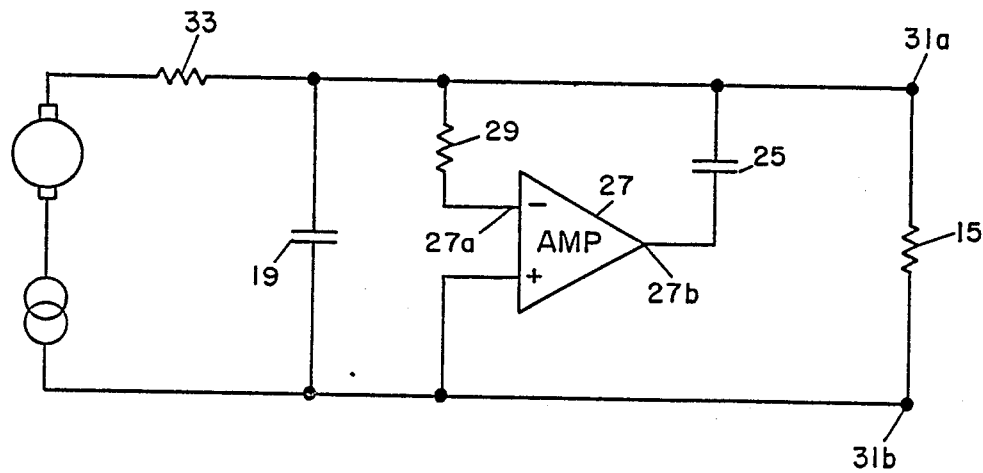
FIG. 2 is a schematic diagram of a ripple level reducing circuit demonstrating the embodiment of FIG. 1 wherein a coupling resistor is employed as the ripple sensing element.

Refer now to FIG. 2, wherein elements previously referenced bear the previously assigned reference numerals, and wherein the amplifier 23 (FIG. 1) is a differential amplifier 27 and the ripple sensing element 21 (FIG. 1) is a resistor 29 coupled between an output terminal 31a and the inverting terminal 27a of the differential amplifier 27. In this configuration the ripple voltage at the output terminal 31a is coupled to the inverting terminal 27a of differential amplifier 27 via the coupling resistor 29. This ripple voltage is inverted, amplified, and coupled to the output terminal 31a via capacitor 25 to provide a signal at the output terminals of the differential amplifier 27 which is substantially in phase opposition to the ripple voltage at the output terminal 31a. Little phase shift is realized between the output terminal 27b of the differential amplifier 27 and the output terminal 31a due to the capacitive coupling, because the resistance of resistor 15 is much greater than the impedance of the capacitor 19 at the ripple frequencies. Consequently a capacitive voltage divider is established by the capacitors 19 and 25. Such voltage dividers do not impart phase shift to the output voltage. It should be recognized by those skilled in the art that the coupling resistor 29 may be replaced by a direct connection when a very high input impedance is provided by the differential amplifier 27. Those skilled in the art should further recognize that the shunt capacitor 19 may be removed and the ripple reduced solely by the novel anti-ripple circuit. In this configuration the effective capacitance exhibited by the anti-ripple capacitor 25 provides a reactance of a value that is much lower than the resistance value of the load resistor 15. Therefore, very little phase shift is realized by the signal coupled from output terminal 27b of the differential amplifier to the output terminal 31a.

The circuit in FIG. 2 has been implemented to reduce a 10 volt peak-to-peak ripple at a frequency of 8 KHz with the shunt capacitor 19 having a value of 10 MF, the load resistance 15 a value of 100 ohms, the anti-ripple capacitor 25 a value of 1.0 MF, the coupling resistor 29 having a value of 220 ohms and the source impedance being a resistor 33 of 10 ohms. Without the anti-ripple capacitor 25, amplifier 27, and coupling resistor 29 the ripple was reduced to 2 volts peak-to-peak. Addition of the novel circuit caused a further ripple reduction to 0.5 volts peak-to-peak. To reduce the ripple to this level by adding another shunt capacitor would require a capacitor of 30 MF. Thus the anti-ripple circuit with a 1.0 OMF capacitor achieves the performance of a 30 MF capacitor.

Figure 3:
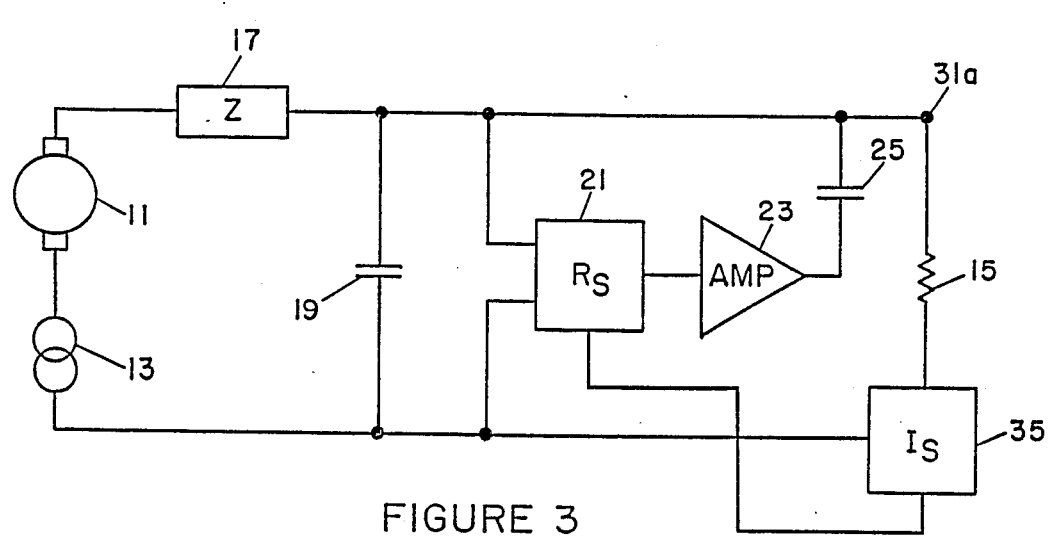
FIG. 3 is a schematic diagram, partially in block form, of a ripple level reducing circuit utilizing a second embodiment of the invention.
Figure 4:
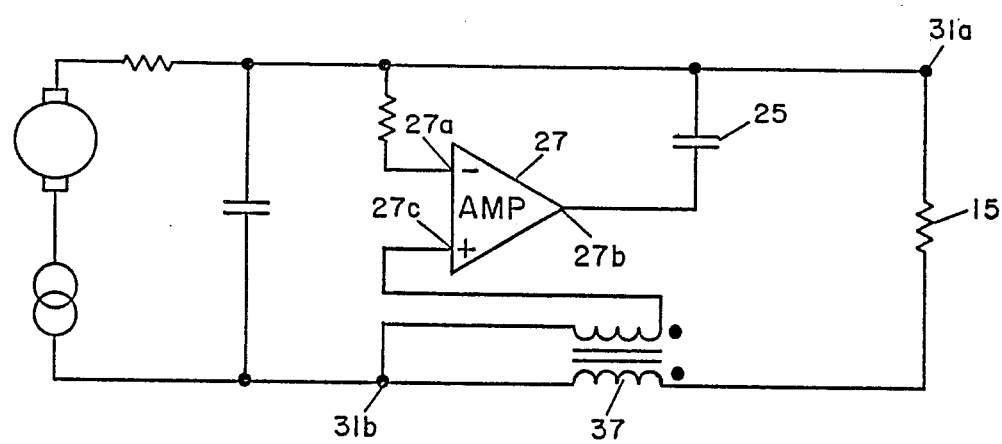
FIG. 4 is a schematic diagram of a ripple level reducing circuit demonstrating the embodiment of FIG. 3 wherein the ripple sensing element is a resistor and the current sensing element is a transformer.

Ripple reduction achieved by the novel circuit is a function of the amplifier 27 (amplifier 23 FIG. 1), increasing the amplification causing an increase in ripple reduction. As the gain of the amplifier increases, however, the amplifier tends to become unstable and will oscillate when the gain achieves a critical level. This limitation may be alleviated with the embodiment of the invention shown in FIG. 3, wherein elements previously referenced bear the previously assigned reference numerals. A current sensing element 35 couples a voltage representative of the load current to the ripple sensing element 21 in a manner that compensates for the finite gain of the system, thereby further reducing the ripple level. This may be accomplished in the circuit of FIG. 2 by coupling the primary windings of a current transformer 37 between the load 15 and the output terminal 31b, while the secondary windings of the current transformer 37 are coupled between the output terminal 31b and the non-inverting terminal 27c of the differential amplifier 27 as shown in FIG. 4. Ripple current flowing through the load 15 is sensed by the transformer 37 and a voltage representative thereof is coupled to the differential amplifier 27 as a variable reference. The voltage that is coupled via anti-ripple capacitor 25 to oppose the ripple voltage is then a function of the ripple voltage referenced to the voltage representative of the ripple current. Thus the anti-ripple capacitor 25 is driven in a manner to oppose the ripple current, thereby providing additional ripple level reduction. Since the ripple current is a function of both the ripple voltage and the load impedance, the reference voltage established as described above provides further capacitive reduction by minimizing the capacitive dependence or the load variation.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An apparatus for reducing ripple signals on a d.c. signal coupled across first and second terminals comprising:
   a differential voltage amplifier, having a gain, an inverting voltage input terminal coupled to said first terminal, a non-inverting voltage input terminal coupled to said second terminal, and a voltage output terminal responsive to voltage differences between voltages coupled to said inverting voltage input terminal and said non-inverting voltage input terminal; and
   a capacitor having a capacitance value, a first plate directly connected to said output terminal and a second plate directly connected to said first terminal, said capacitor and said differential voltage amplifier constructed and arranged to multiply said capacitance value by a factor determined by said gain such that a shunt capacitance value is developed across said first and second terminals that is equal to said capacitance value multiplied by said factor whereby said ripple signal is reduced in accordance with said shunt capacitance value.

2. The apparatus of claim 1 further including a resistor coupled between said inverting terminal and said first terminal.

3. An apparatus for reducing ripple signals on a d.c. signal coupled across first and second terminals comprising:
   a differential amplifier having an inverting input terminal coupled to said first terminal, a non-inverting terminal coupled to said second terminal, and an output terminal;
   a capacitor coupled between said output terminal and said first terminal; and
   a transformer having primary winding terminals coupled between said first and second terminals and secondary winding termnals coupled between said non-inverting terminal and said second terminal.

4. An apparatus for reducing ripple signals coupled across first and second terminals comprising:
   ripple sensing means coupled to said first terminal for providing sensed ripple signals representative of said ripple signals;
   phase opposition means having input means coupled to receive said sensed ripple signals for providing sensed ripple representative signals that are in phase opposition to said ripple signals;
   means having input means coupled to receive said sensed ripple representative signals and outupt means coupled to said first terminal for providing ripple reducing signals to said first terminal; and
   current sensing means coupled between said first and second terminals and to said input means of said phase opposition means for providing reference current signals at said input means of said phase opposition means that are representative of ripple current flowing between said first and second terminals such that said phase opposition means provides signals representative of a combination of said reference current signals and said sensed ripple signals, said signals representative of said combination being in phase opposition to said ripple signals.

* * * * *